W. A. WARMAN.
VALVE MECHANISM FOR PUMPS, ENGINES, &c.
APPLICATION FILED AUG. 9, 1912.

1,109,271.

Patented Sept. 1, 1914.
2 SHEETS—SHEET 1.

Attest:

Inventor:

by

Atty

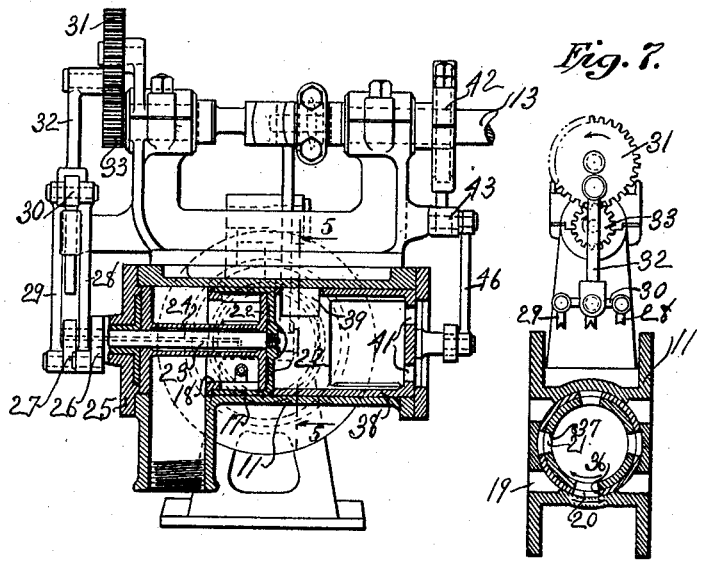
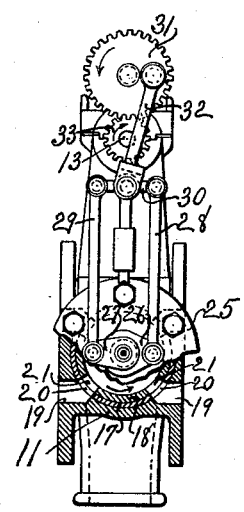
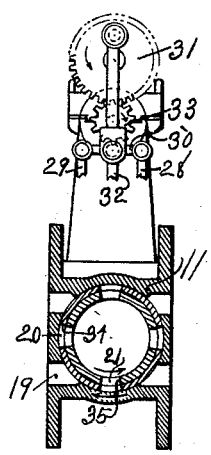

UNITED STATES PATENT OFFICE.

WILLIAM A. WARMAN, OF NEW YORK, N. Y.

VALVE MECHANISM FOR PUMPS, ENGINES, &c.

1,109,271. Specification of Letters Patent. Patented Sept. 1, 1914.

Application filed August 9, 1912. Serial No. 714,159.

*To all whom it may concern:*

Be it known that I, WILLIAM A. WARMAN, a citizen of the United States, and a resident of New York, borough of Manhattan, in the county of New York and State of New York, have made and invented certain new and useful Improvements in Valve Mechanism for Pumps, Engines, &c., of which the following is a specification.

My invention relates to positively operated valve mechanism for air or gas compressors, pumps, engines, and similar devices, and the object thereof is to provide valve mechanism in which the opening and closing movements of the valve members occur more rapidly than is usually the case in valve mechanism of the type in question; to provide an improved arrangement of supply and discharge valves for devices of the class to which my invention is applicable; and to provide positively operated valve mechanism which will be simple in construction, and effective for the purpose for which it is designed.

With the above and other objects of invention in view my invention consists in the valve mechanism illustrated in the accompanying drawing, described in the following specification, and particularly claimed in clauses of the concluding claim, and in such variations and modifications thereof as will be obvious to those skilled in the art to which my invention relates.

Figure 1:
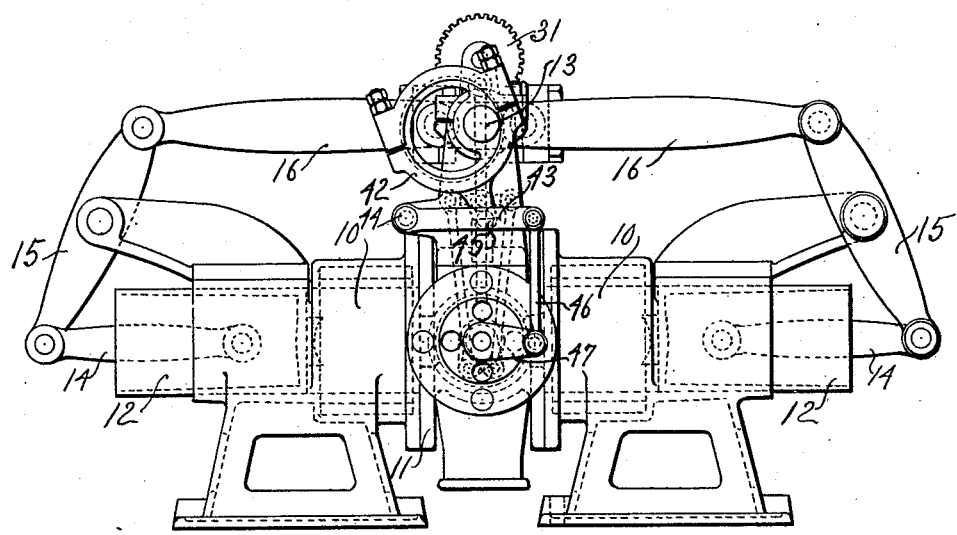
Figure 2:
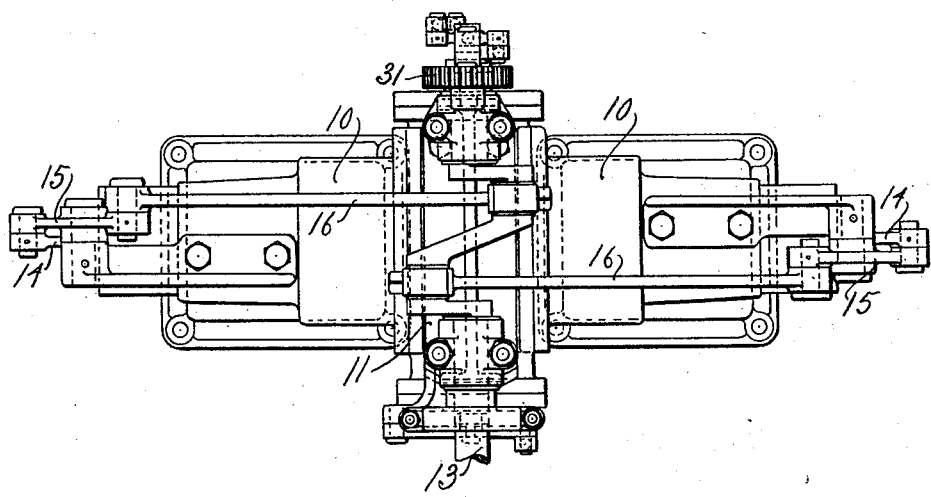

In the drawings accompanying and forming a part of this application: Figure 1 is a view showing an air compressor in side elevation, the same being equipped with my improved valve mechanism; Fig. 2 is a view showing the same in plan; Fig. 3 is a view showing a section of the valve mechanism upon a vertical transverse plane passing through the valve members; Fig. 4 is a view partly in side elevation and partly in section illustrating one of the valves of my valve mechanism as seen from a position to the left of Fig. 3; Fig. 5 is a view showing a section upon a vertical longitudinal plane indicated by the line 5—5, Fig. 3; and Figs. 6 and 7 are views similar to Fig. 4 but illustrating the mechanism shown in said figure in two other positions.

In the drawings, the reference character 10 designates cylinders arranged upon opposite sides of a valve chamber 11, and 12 designates pistons moving one in each of said cylinders. Each piston is operatively connected with a crank shaft 13 through pitman 14, levers 15 and connecting rods 16, the whole forming a compressor or pump in which the pistons move simultaneously toward and from one another.

While I have disclosed my improved valve mechanism in connection with an air compressor of the type above described, the same is in no way inseparably associated with any particular form of air pump or similar device, and may be used with pumps of various types.

My improved valve mechanism includes two oscillating valve members 17, 18 located within a valve chamber such as the valve chamber 11 above referred to, one of which members rests upon a seat provided for it in said chamber and the other of which rests upon the first-mentioned member, the two members having each one or more ports, the ports of the two members being adapted to register with one another and with a corresponding number of ports in the valve seat, to thereby control the flow of fluid operated upon by the pump, as will be understood from Figs. 4, 6 and 7 of the drawings.

The ports in the valve chamber are designated as 19, 20 designates the ports in the valve member 17, and 21 the ports in the valve member 18.

The embodiment of my invention illustrated is provided with four ports in the valve chamber, two leading to each of the cylinders 10, and each valve member is likewise provided with four ports, this being for the purpose of providing as large passages as possible for the fluid to flow through; although it will be understood that the valve members do not necessarily have more than one port in each, in which case these two ports when in registry with one another register with a single port in the valve chamber.

The oscillating valve members 17, 18 above referred to are preferably cylindrical or conical in form, and are inclosed at one end as at 22, and are arranged concentrically to coöperate with a valve seat of like form. The outer valve member 17 which moves in contact with the valve seat is provided with a central operating rod 23 operatively connected with its closed end 22, and the inner valve member 18 is provided with a sleeve 24 through which it is operated and which sleeve surrounds the rod 23. Both the rod and sleeve extend through a cover 25 to the exterior of the valve chamber, the sleeve being there provided with an arm 26 and the rod with a similar arm 27. The arms 26, 27 extend in opposite directions from one another, as shown in Fig. 4, from which it will be obvious that when the free ends of said arms are moved simultaneously downward or upward the valve members will be moved simultaneously in opposite directions and the ports in the two valves moved into registry with one another and with the port in the valve seat, as shown in Fig. 4 of the drawings, the port in the valve seat being thus opened or closed in one-half the time required in cases where a single valve member is moved to open and close a port.

The oppositely moving valve members above referred to may obviously be employed to control either a supply or an exhaust port, or a port through which fluid flows both into and from a cylinder, although in the embodiment of my invention illustrated they are shown as controlling an exhaust or discharge port; furthermore, while I have shown my invention as used in connection with a pump or compressor, the same may obviously be used with an engine, as above pointed out.

The preferred mechanism for moving the free ends of the arms 26, 27 simultaneously upward and downward comprises two links 28, 29, the lower ends of which are pivotally connected one with each of said arms, and the upper ends of both of which are pivotally connected to a reciprocating cross-head 30; which cross-head is operatively connected with a gear 31 by means of a connecting rod 32. The gear 31 is operated from the crank shaft 13 at one-half the angular velocity of the said shaft as by means of a gear 33 upon said shaft, the diameter of which is one-half the diameter of the gear 31. From this it follows that, starting with the position of the valve members shown in Fig. 4, rotary movement of the gear 31 in the direction indicated by the arrows in Fig. 4 will move the valve members into the position shown in Fig. 6, during which movement the ports 20, 21 have been moved out of registry with one another and with the ports 19, thereby interrupting the flow through said several ports. Subsequently, and as the gear continues to rotate, the valve members will be again moved into positions to open the ports 19, and will finally be moved into a second position in which all the ports 19 are closed, as shown in Fig. 7. Each upward and downward movement of the connecting rod 32, however, occurs during two strokes of the pistons 12 (that is, during an outward and an inward stroke thereof); from which it follows that if the valve members are adjusted, as shown in the drawings, to open the ports 19 during the inward strokes of the pistons, the valve members will be moved to again open said ports upon the next inward stroke of the pistons, but, in moving to open said ports the second time, each valve will be moving in a direction the reverse of that in which it first moved in opening said port. This will be understood from Figs. 6 and 7 in which the arrows adjacent the valve members show the directions in which the said members were moving just before coming into the dead center position or position of rest in which they are shown. From this it follows that opposite edges of the ports in the valve members coöperate alternately to cut off the flow through the ports 19. For example, as the valve members 17, 18 move from the position shown in Fig. 6 into the position shown in Fig. 7, the ports 19 are first opened and subsequently closed as the edges 34, 35 of the ports 20, 21 pass one another; while as the valve members move from the position shown in Fig. 7 to that shown in Fig. 6 the ports 19 are first opened and subsequently closed as the edges 36, 37 of the ports 20, 21 pass one another; thus distributing the wear due to flow through the ports equally upon both the sides or edges of the ports.

The valve mechanism thus far described is shown as employed as the discharge valve of an air compressor, the inlet or supply valve 38 of which is shown as also cylindrical in form and located within the chamber 11 with its axis coinciding with the axis of the valve members 17, 18, above described. The valve 38 is provided with two ports 39 adapted to register with ports 40 in the valve chamber, and openings 41 are provided through which air may flow into said valve and to the cylinder 10. The valve 38 is shown as operated by means of an eccentric 42 upon the shaft 13 through a lever 43 fulcrumed at 44, the eccentric being connected with said lever at 45 and the free end of said lever being pivotally connected with a link 46 the lower end of which is pivotally connected with an arm 47 operatively connected with said valve. From this it will be seen that the supply valve is operated in unison with the main shaft 13 of the compressor to admit air to the cylinders at each outward stroke of the pistons. It will be understood, however, that a supply valve having two concentric valve members as hereinbefore described, may be employed if desired.

Having thus described and explained my invention, I claim and desire to secure by Letters Patent:—

1. In valve mechanism, a valve chamber having a valve seat and a port in said seat; two oscillating valve members in contact with one another and one of which moves in contact with said seat, said valve members having each a port, which ports are adapted to register with one another and with the port in said seat; and means for moving said valve members simultaneously in opposite direction, the arrangement of the parts being such that the ports of said valve members register with one another and with the port in said valve seat when said members are in their middle positions.

2. In valve mechanism, a valve chamber having a cylindrical valve seat and a port in said seat; two concentric oscillating cylindrical valve members in contact with one another and one of which moves in contact with said seat, said valve members having each a port, which ports are adapted to register with one another and with the port in said seat; and means for moving said valve members simultaneously in opposite directions to move the ports of said valve members past one another and past the port in said valve seat, and simultaneously in opposite directions but reversed with reference to said first mentioned movements to again move the ports of said valve members past one another and past the port in said valve seat.

3. In valve mechanism, a valve chamber having a cylindrical valve seat and a port in said seat; two concentric oscillating cylindrical valve members in contact with one another and one of which moves in contact with said seat, said valve members having each a port, which ports are adapted to register with one another and with the port in said seat; means for moving said valve members simultaneously in opposite directions; a second port in said valve seat; a second oscillating cylindrical valve member having a port adapted to register with the second port in said valve seat; and means for moving said second-mentioned valve member.

4. In a device of the class described, a cylinder; a reciprocating piston therein; and valve mechanism for controlling the flow of fluid operated upon by said piston, said valve mechanism including a valve seat having a port; two oscillating valve members in contact with one another, and one of which is in contact with said seat, said valve members having each a port, which ports are adapted to register with one another and with the port in said valve seat; and means for moving said valve members simultaneously in opposite directions relative to one another upon one stroke of said piston, and simultaneously in opposite directions relative to one another, but which directions are reversed as to each valve member, upon the next succeeding stroke of said piston in the same direction.

5. In a device of the class described, a cylinder; a reciprocating piston therein; and valve mechanism for controlling the flow of fluid operated upon by said piston, said valve mechanism including a cylindrical valve seat having a port; two concentric oscillating cylindrical valve members in contact with one another, and the outer of which is in contact with said seat, said valve members having each a port, which ports are adapted to register with one another and with the port in said valve seat; and means for moving said valve members simultaneously in opposite directions relative to one another upon one stroke of said piston, and simultaneously in opposite directions relative to one another, but which directions are reversed as to each valve member, upon the next succeeding stroke of said piston in the same direction.

6. In a device of the class described, a cylinder; a reciprocating piston therein; a rotary shaft operatively connected with said piston; a gear carried by said shaft; a second gear operated from said first-mentioned gear at one-half the speed of rotation of said shaft; a port opening into said cylinder and through which fluid may flow; valve mechanism including two oscillating valve members for opening said port upon each successive movement of said piston in one direction; and means intermediate said valve mechanism and said second-mentioned gear through which said valve mechanism is operated.

7. In a device of the class described, a cylinder; a reciprocating piston therein; a rotary shaft operatively connected with said piston; a gear carried by said shaft; a second gear in engagement with said first-mentioned gear and the diameter of which is twice that of said first-mentioned gear; a port opening into said cylinder and through which fluid may flow; valve mechanism including two oscillating valve members in contact with one another and movable simultaneously in opposite directions, and adapted to open said port upon each successive movement of said piston in one direction; and means intermediate said second-mentioned gear and said valve mechanism through which said valve members are operated.

8. In a device of the class described, a cylinder; a reciprocating piston therein; a rotary shaft operatively connected with said piston; a gear carried by said shaft; a second gear in engagement with said first-mentioned gear and the diameter of which is twice that of said first-mentioned gear; a port opening into said cylinder and through which fluid may flow; a reciprocating crosshead operated by said second-mentioned gear; two concentric oscillating valve members in contact with one another and adapted to move simultaneously in opposite directions and to open said port upon each successive movement of said piston in one direction; a valve chamber in which said valve members are located; two arms, one of which is operatively connected with each of said valve members; and a link intermediate each of said arms and said cross-head and through which said valve members are operated.

9. In valve mechanism, a valve chamber having a valve seat and a port in said seat; two valve members in contact with one another and one of which is in contact with said seat; said valve members being movable relatively to one another and having each a port, which ports are adapted to register with one another and with the port in said seat when said valve members are in their middle positions; and means for moving said valve members.

10. In valve mechanism, a valve chamber having a valve seat and a port in said seat; two valve members in contact with one another and one of which is in contact with said seat, said valve members being movable in opposite directions relatively to one another and having each a port, which ports are adapted to register with one another and with the port in said seat when said valve members are in their middle positions; and means for moving said valve members simultaneously in opposite directions.

Signed at New York, borough of Manhattan, in the county of New York and State of New York, this 7th day of August, A. D. 1912.

WILLIAM A. WARMAN.

Witnesses:
A. V. WALSH,
R. N. FLINT.

Copies of this patent may be obtained for five cents each, by addressing the "Commissioner of Patents, Washington, D. C."